United States Patent
Hunter et al.

(10) Patent No.: US 12,282,004 B2
(45) Date of Patent: Apr. 22, 2025

(54) UNIVERSAL MODULAR PROPERTIES TEST FIXTURE

(71) Applicant: Regeneron Pharmaceuticals, Inc., Tarrytown, NY (US)

(72) Inventors: Christopher Hunter, Castleton-on-Hudson, NY (US); Ruchika Sharma, Rensselaer, NY (US); Wesley Mahunik, Rensselaer, NY (US)

(73) Assignee: Regeneron Pharmaceuticals, Inc., Tarrytown, NY (US)

( * ) Notice: Subject to any disclaimer, the term of this patent is extended or adjusted under 35 U.S.C. 154(b) by 449 days.

(21) Appl. No.: 17/753,748

(22) PCT Filed: Sep. 16, 2020

(86) PCT No.: PCT/US2020/051079
§ 371 (c)(1),
(2) Date: Mar. 14, 2022

(87) PCT Pub. No.: WO2021/055483
PCT Pub. Date: Mar. 25, 2021

(65) Prior Publication Data
US 2022/0390336 A1 Dec. 8, 2022

Related U.S. Application Data

(60) Provisional application No. 62/914,274, filed on Oct. 11, 2019, provisional application No. 62/901,122, filed on Sep. 16, 2019.

(51) Int. Cl.
*G01N 3/02* (2006.01)
*G01N 3/04* (2006.01)
*G01N 3/08* (2006.01)

(52) U.S. Cl.
CPC ............... *G01N 3/02* (2013.01); *G01N 3/08* (2013.01); *G01N 3/04* (2013.01);
(Continued)

(58) Field of Classification Search
CPC ... G01N 2203/0447; G01N 2203/0423; G01N 2203/04; G01N 2203/0016; G01N 3/08; G01N 3/04; G01N 3/02
(Continued)

(56) References Cited

U.S. PATENT DOCUMENTS 3,375,709 A * 4/1968 Holmes .................... G01N 3/16 73/796
5,431,060 A * 7/1995 Lauren ..................... G01N 3/08 73/831

(Continued)

FOREIGN PATENT DOCUMENTS

CN 203643276 U * 6/2014
CN 111965013 A * 11/2020
(Continued)

OTHER PUBLICATIONS

Translation CN_203643276 (Year: 2014) Jun. 11, 2014.*
(Continued)

*Primary Examiner* — Xin Y Zhong
*Assistant Examiner* — Monica S Young
(74) *Attorney, Agent, or Firm* — Bookoff McAndrews, PLLC

(57) ABSTRACT

A modular test fixture is configured to quickly support test samples of different configurations for testing.

26 Claims, 14 Drawing Sheets

(52) U.S. Cl.
CPC . *G01N 2203/0016* (2013.01); *G01N 2203/04* (2013.01); *G01N 2203/0447* (2013.01)

(58) Field of Classification Search
USPC .......................................................... 73/818
See application file for complete search history.

(56) References Cited

U.S. PATENT DOCUMENTS

| | | | | |
|---|---|---|---|---|
| 6,629,466 | B2 * | 10/2003 | Grote | G01N 3/04 |
| | | | | 73/857 |
| 7,681,459 | B1 | 3/2010 | Yang et al. | |
| 7,770,467 | B1 | 8/2010 | Halderman et al. | |
| 8,261,809 | B2 * | 9/2012 | Shiose | B22D 18/04 |
| | | | | 164/119 |
| 2009/0120199 | A1 | 5/2009 | Hemmerlin | |
| 2015/0377754 | A1 | 12/2015 | Kanade et al. | |
| 2019/0234845 | A1 * | 8/2019 | Kampmann | G01N 3/02 |
| 2022/0390336 | A1 * | 12/2022 | Hunter | G01N 3/04 |

FOREIGN PATENT DOCUMENTS

| | | | | |
|---|---|---|---|---|
| CN | 112525719 A | * | 3/2021 | |
| CN | 113295541 A | * | 8/2021 | |
| CN | 113702153 A | * | 11/2021 | |
| DE | 202014000606 U1 | | 2/2014 | |
| JP | S54117440 A | | 9/1979 | |
| JP | S56047733 A | | 4/1981 | |
| JP | 2003329558 A | | 11/2003 | |
| JP | 2004009739 A | | 1/2004 | |
| WO | WO-9947824 A1 | * | 9/1999 | .............. F16C 29/02 |

OTHER PUBLICATIONS

WO_9947824 (Year: 1999) Sep. 23, 1999.*
Search Report for Eurasian Application No. 202392361, 3 pages, Nov. 21, 2023.
International Search Report and Written Opinion issued in International Application PCT/US2020/051079, dated Dec. 1, 2020.

* cited by examiner

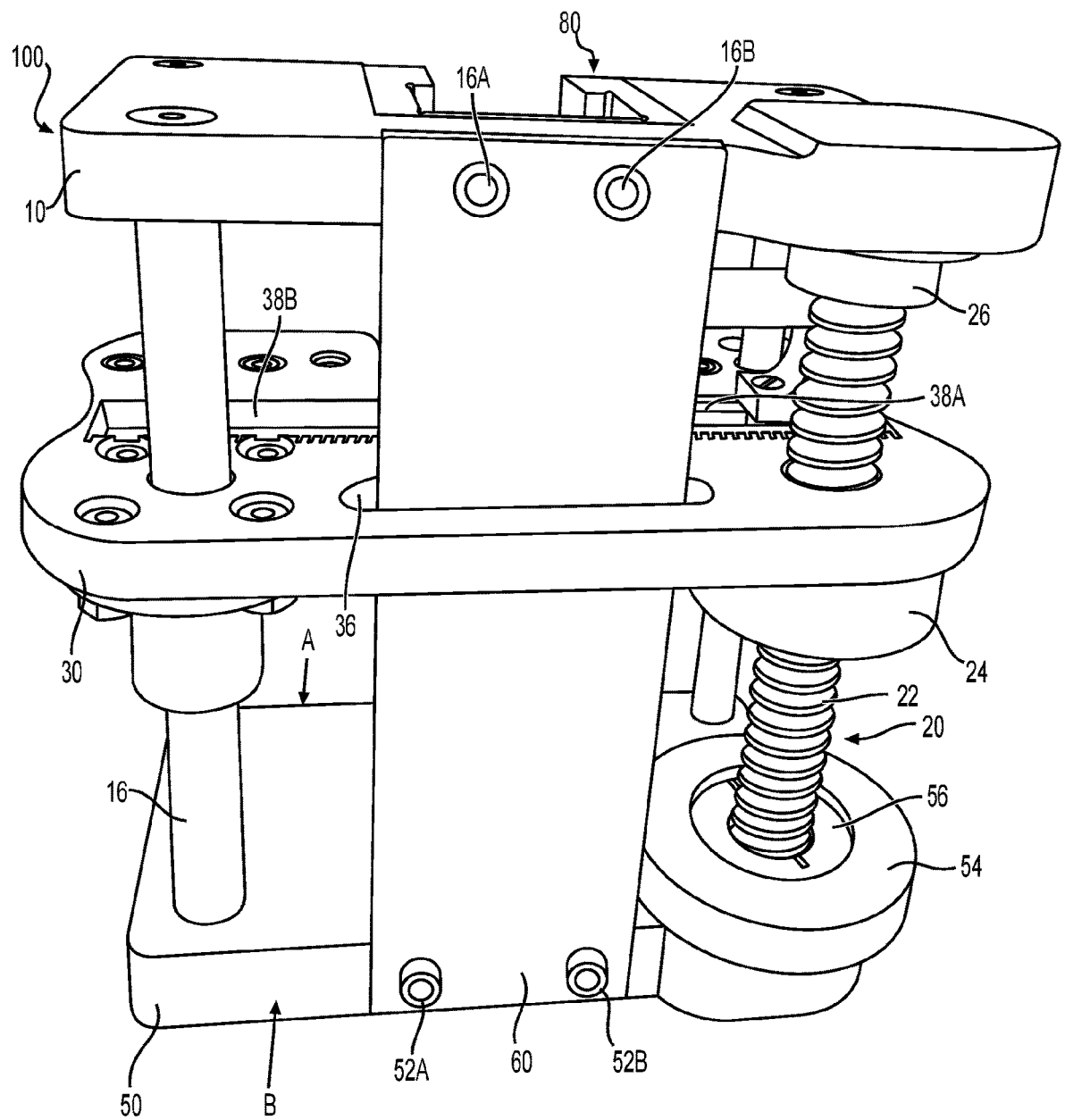
FIG. 1C
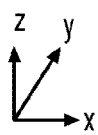

UNIVERSAL MODULAR PROPERTIES TEST FIXTURE

CROSS-REFERENCE TO RELATED APPLICATIONS

This application is a U.S. national stage filing under 35 U.S.C. § 371 of International Application No. PCT/US2020/051079, filed Sep. 16, 2020, which claims priority to U.S. Provisional Application No. 62/901,122, filed on Sep. 16, 2019, and to U.S. Provisional Application No. 62/914,274, filed on Oct. 11, 2019, the entireties of each of which are incorporated by reference herein.

TECHNICAL FIELD

Embodiments of this disclosure relate to modular test fixtures having a different configurations, that may be used for a variety of mechanical tests of samples.

BACKGROUND

Test fixtures are used to support samples undergoing testing on a testing machine (such as, for example, a universal testing machine or UTM). If the samples being tested have a similar configuration or shape (e.g., a tensile test of a rod), a test fixture that is configured to support only the similarly shaped samples (e.g., grip the rods) is used in the testing machine. However, if different configurations of samples and/or different types of tests (e.g., needle cap removal force test, flange breaking strength test, etc.) are to be performed, typically, the test fixtures (grips, etc.) that support the samples during the test will have to be replaced to accommodate a different configuration of the sample and/or test. Replacing or reconfiguring the test fixture between tests take time and decreases efficiency. In such cases, it is desirable to use a test fixture that is configured to support the differently sized samples in a configuration that allows the desired type of force to be applied on the sample with minimal changes to the test fixture. Embodiments of the current disclosure include modular test fixtures that may be easily adapted or configured to support different configurations of samples undergoing different types of tests on a testing machine. The scope of the current disclosure, however, is defined by the attached claims, and not by the ability to solve any specific problem.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. Each of the embodiments disclosed herein may include one or more of the features described in connection with any of the other disclosed embodiments.

FIGS. 1A-1D illustrate different views of an exemplary test fixture of the present disclosure.

DETAILED DESCRIPTION

The present disclosure describes an exemplary test fixture that may be used in conjunction with a universal testing machine (UTM), such as, for example, an Instron testing machine. While principles of the current disclosure are described with reference to a test fixture for a UTM, it should be understood that the disclosure is not limited thereto. Rather, the disclosed test fixtures may be used alone, or in conjunction with any type of apparatus or machine (used in any application). In general, relative terms used in this disclosure, such as "about," "substantially," or "approximately" are used to indicate a possible variation of +10% in the stated value. Any implementation described herein as exemplary is not to be construed as preferred or advantageous over other implementations. Rather, the term "exemplary" is used in the sense of example or illustrative.

Figure 1A:
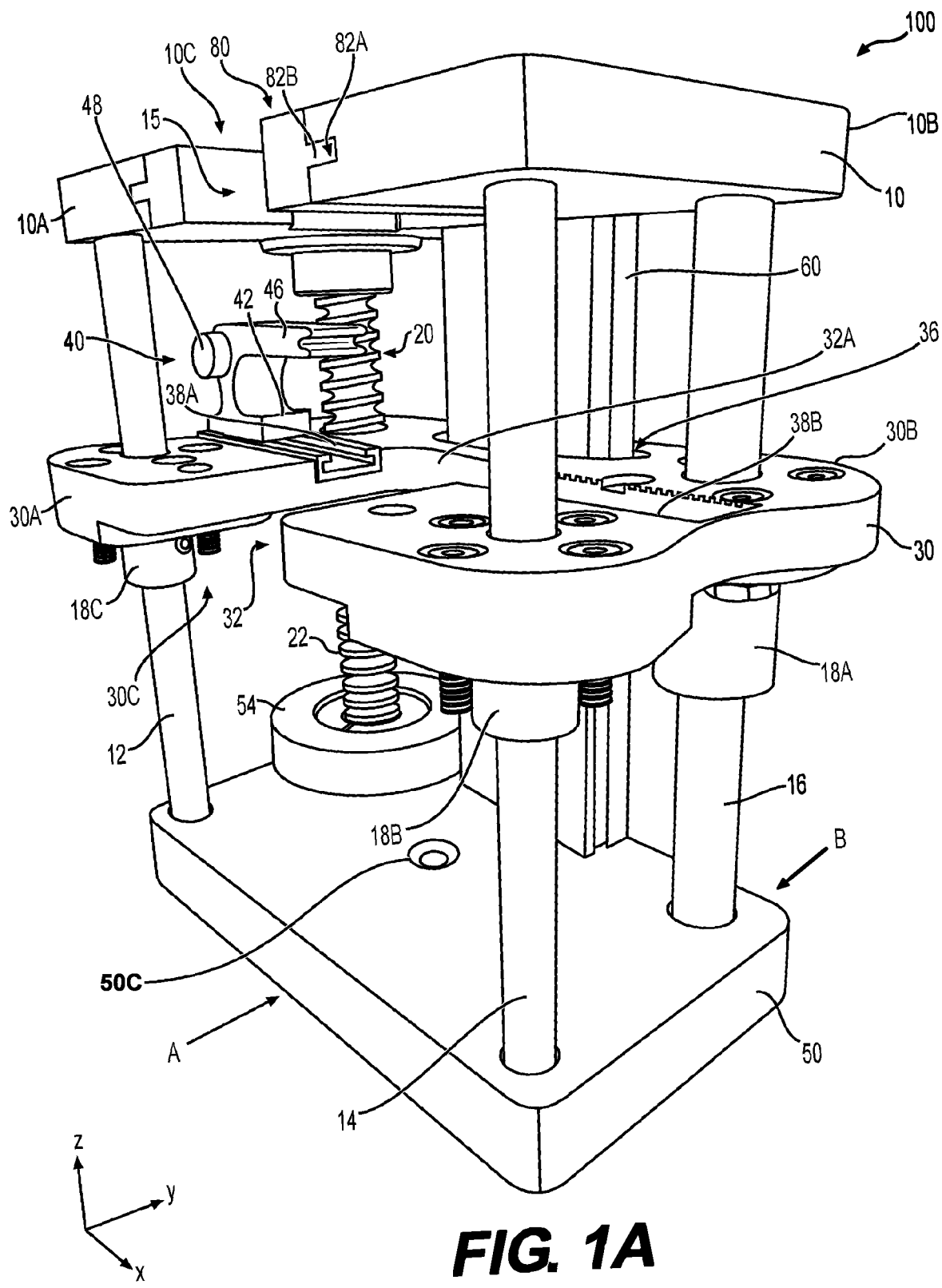
Figure 1B:
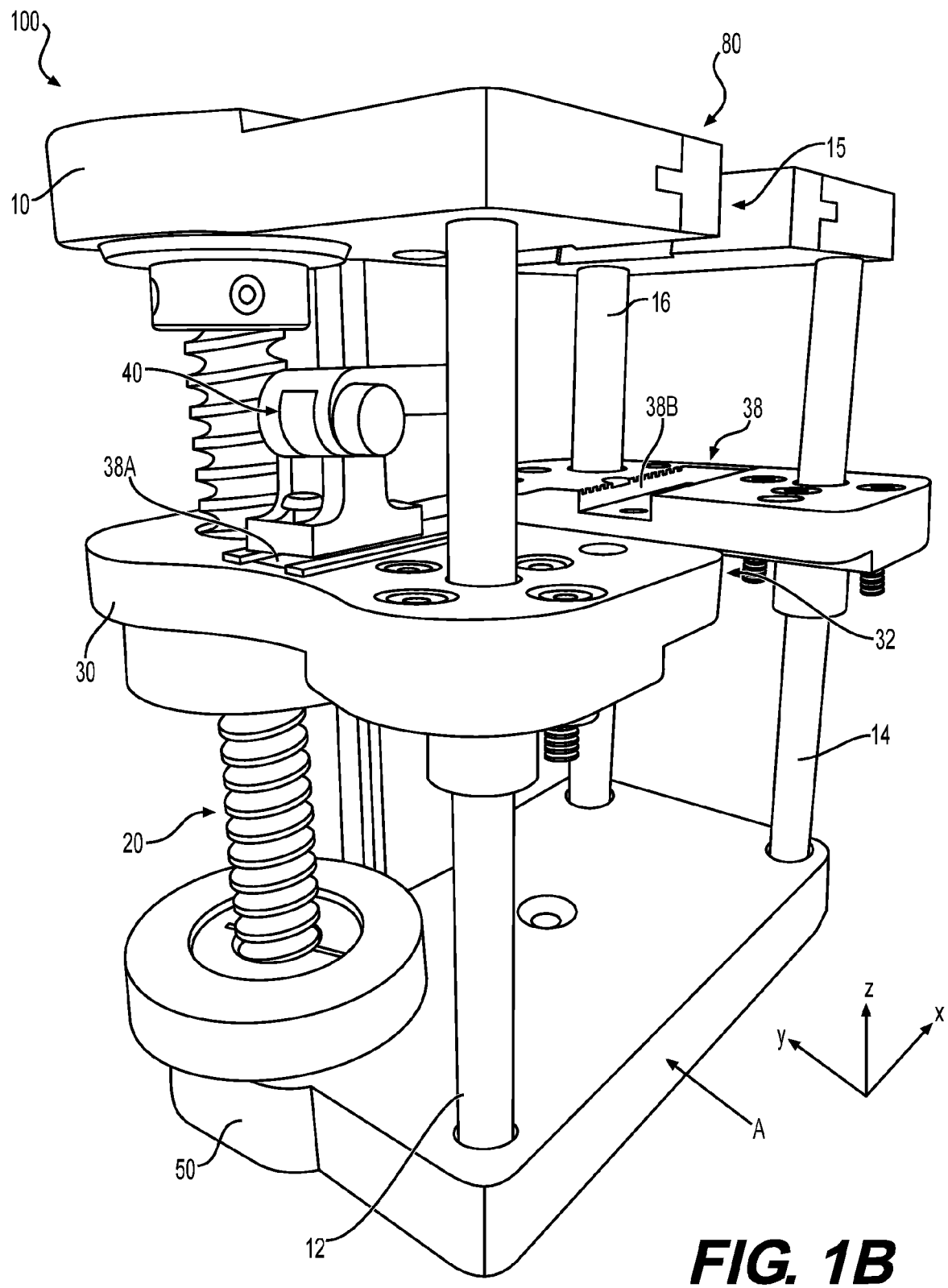
Figure 1D:
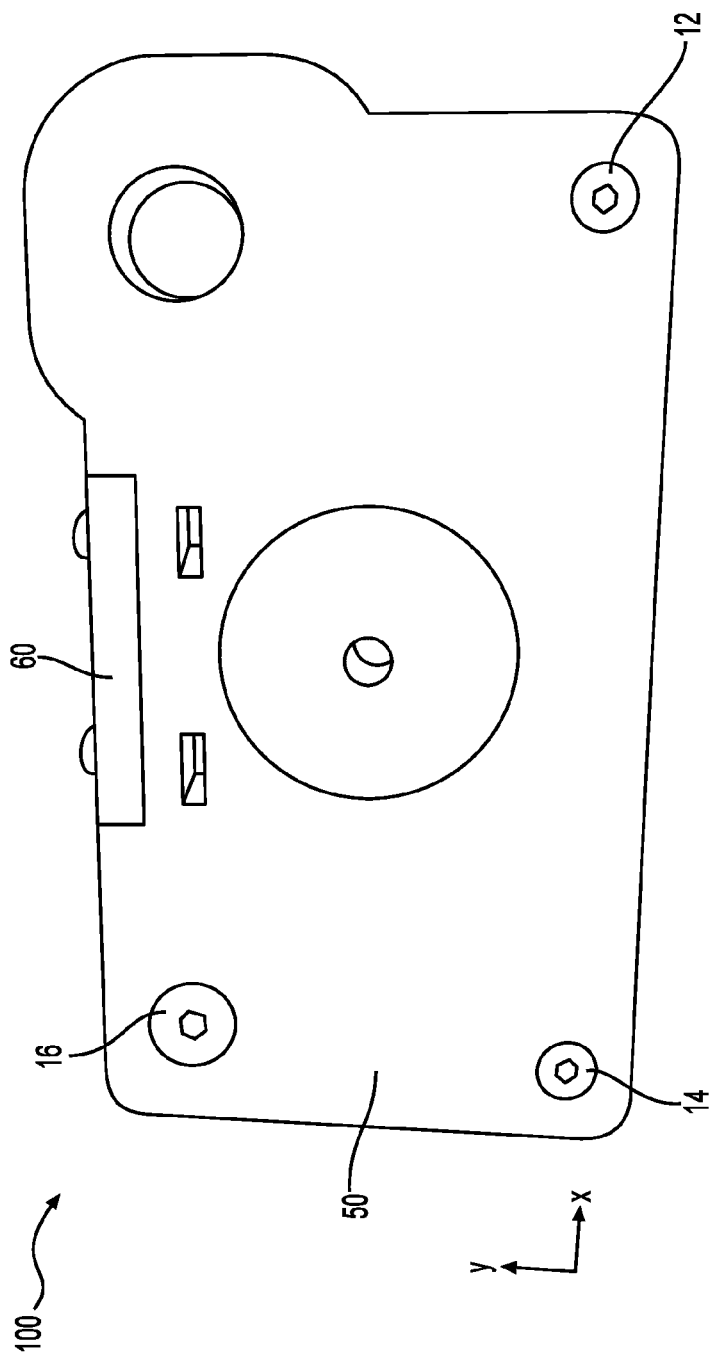

FIGS. 1A-1C illustrate different perspective views of an exemplary test fixture (testing device) 100 of the current disclosure, and FIG. 1D illustrates a bottom view of test fixture 100. In the discussion that follows, reference will be made to FIGS. 1A-1D. In the embodiment illustrated in these figures, test fixture 100 includes a top plate 10, a middle plate 30, and a bottom plate 50 spaced apart in the z-direction (see XYZ triad in FIGS. 1A-1C). In the discussion that follows, the z-direction will be referred as the vertical direction, and the end marked "A" will be referred to as the front end of the test fixture 100, and the end marked "B" will be referred to as its back end. However, it should be noted that references to "front," "back," "top," "bottom," etc. are merely for the sake of convenience and are not a requirement.

As illustrated in FIGS. 1A-1D, top, middle, and bottom plate 10, 30, 50 may be generally planar structures that extend in the x-y plane, and thus may each be substantially parallel to one another. Although not a requirement, in some embodiments, top, middle, and bottom plates 10, 30, and 50 may have a generally rectangular shape (in the XY plane) as shown in the figures. Top, middle, and bottom plates 10, 30, and 50 may be formed of any material and may be formed in any suitable manner. Although not a requirement, in some embodiments, these plates 10, 30, 50 may include a plastic or polymeric material (such as, for e.g., nylon, glass-filled polyamide, epoxy resin, polycarbonate, etc.). These plates may be formed or fabricated in any suitable manner (machining, molding, etc.). In some embodiments, some or all of these plates may be fabricated using 3D printing. In some embodiments, one or more sheets of reinforcing material may be embedded within top plate 10, middle plate 30, and/or bottom plate 50. For example, one or more of the plates may include sheets of printed metal or fiberglass within an otherwise 3D-printed polymeric plate.

Top, middle, and bottom plates 10, 30, 50 may be coupled together, for example, proximate their corners, by posts 12, 14, 16, and a movable (e.g., turn-screw) assembly 20. As illustrated in the figures, posts 12 and 14 may couple the plates 10, 30, 50 together at the front end A of the test fixture 100, and post 16 and moving assembly 20 may couple the plates 10, 30, 50 together at the back end B of the test fixture 100. As best seen in FIG. 1C, at the back end B, the top and bottom plates 10 and 50 are also coupled together by a spine 60. The moving assembly 20 and the spine 60 will be described later. Although posts 12, 14, and 16 are illustrated as being cylindrical column-like structures having a diameter (in the XY plane), this is only exemplary. In general, these posts 12, 14, and 16 may have any suitable configuration or shape (rectangular, square, etc.). In some embodiments, as best seen in FIG. 1A, posts 12 and 14, that are positioned at the front end A of the test fixture 100, may have a smaller diameter (or width in embodiments where these posts are not cylindrical) than post 16 that is positioned at its back end B. Positioning smaller diameter posts 12 and 14 at the front end A may provide more clearance between these posts 12, 14, and therefore enable samples (syringes, beakers, etc.) to be loaded into the test fixture 100 more easily. Although not a requirement, in some embodiments, posts 12 and 14 may have substantially the same diameter or width, although in other embodiments, posts 12 and 14 may have different diameters and/or widths (each being less than a corresponding diameter and/or width of post 16). Posts 12, 14, and 16 may, in general, be formed of any suitable material and may be formed in any suitable manner. In some embodiments, these posts 12, 14, and 16 may be formed of a metallic material, such as, for example, stainless steel, aluminum, etc., although it is contemplated that in other embodiments, posts 12, 14, and/or 16 may be formed of a polymeric material or a combination of metal and polymer. In some embodiments, posts 12, 14, and/or 16 may be formed by 3D-printing. It is contemplated that test fixture 100 may be coupled to a Universal Testing Machine (UTM), such as a UTM produced by Instron or ZwickRoell. For example, bottom plate 50 may be coupled to a UTM via a bore 50C (see FIG. 1A) that is configured to receive a bolt of the UTM. The bolt may be any suitable size, such as, e.g., an M6 bolt or an M10 bolt.

Figure 2A:
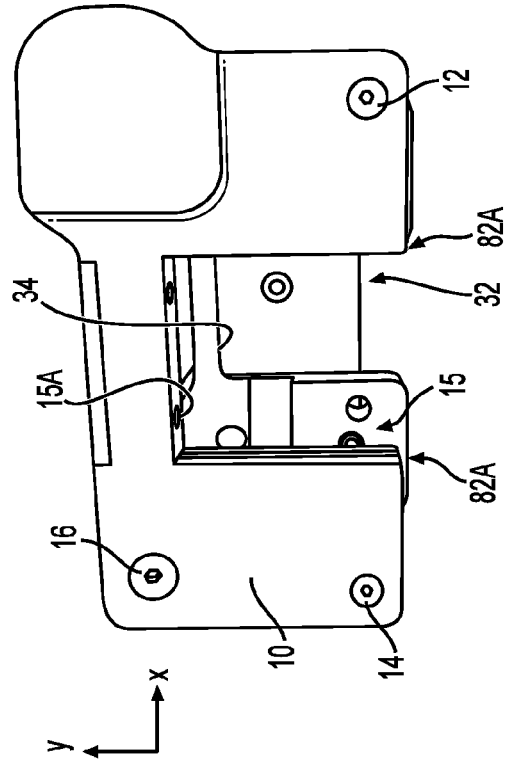
FIG. 2A illustrates a top view of the top plate of the test fixture of FIG. 1A with the sample bracket of the top plate removed.
Figure 2B:
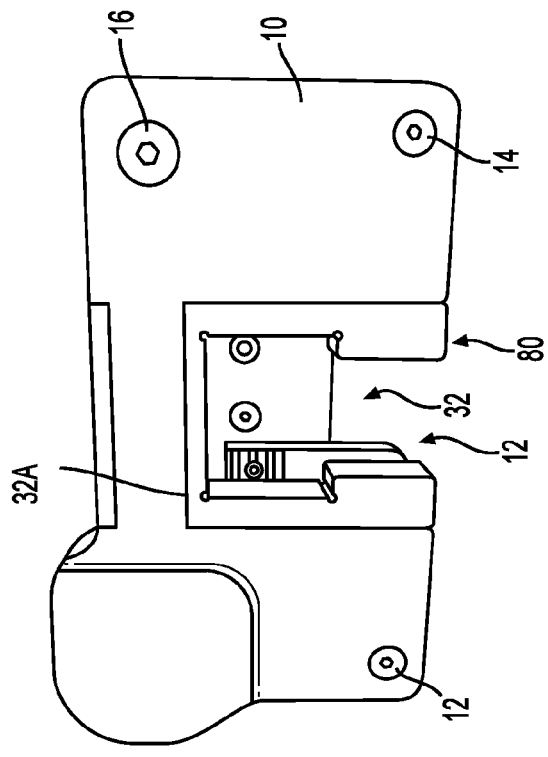
FIG. 2B illustrates the top plate of FIG. 2A with a sample bracket coupled thereto.

Posts 12, 14, and 16 may be fixedly coupled to the top and bottom plates 10, 50 and slidably coupled to the middle plate 30. In other words, top and bottom plates 10, 50 are fixed with respect to the posts 12, 14, 16, and middle plate 30 is slidable in the vertical direction on and relative to the posts 12, 14, 16. Posts 12, 14, and 16 may be fixedly coupled to the top and bottom plates 10, 50 in any manner. In some embodiments, these posts 12, 14, and 16 may be press-fitted on the top and bottom plates 10, 50. Additionally or alternatively, in some embodiments, screws or other types of fasteners may be used to couple the posts 12, 14, 16 to the top and bottom plates 10, 50 (see, for example, FIGS. 1D, 2A, and 2B). In some embodiments, bearings 18A, 18B, and 18C (e.g., linear-motion bearings) may be coupled to the middle plate 30 to enable the middle plate 30 to slide relatively easily on posts 12, 14, and 16. These bearings 18A, 18B, and 18C may also enable or assist in centering the posts 12, 14, and 16 on the corresponding through-hole or cavity on the middle plate 30 that these posts 12, 14, and 16 extend through. In some embodiments, as illustrated in the figures (see, for example, FIGS. 1A-1C), the bearings 18A-18C are coupled to the middle plate 30 using fasteners (e.g., four fasteners) that are substantially symmetrically arranged about the respective post 12, 14, 16. Since suitable bearings 18A, 18B, and 18C that may be used to slidably couple middle plate 30 on the posts 12, 14, and 16 are known to people skilled in the art, they are not described in detail herein. Bearings 18A, 18B, and 18C, are shown in the illustrated embodiment as fastened to an underside of middle plate 30 (i.e., closer to bottom plate 50 than top plate 10). This configuration may help create additional space on middle plate 30 for samples. However, it is contemplated that one or more of bearings 18A, 18B, and/or 18C may be positioned on the top of middle plate 30 (i.e., closer to top plate 10 than bottom plate 50).

Top plate 10 may have a first lateral end surface 10A at front end A, and a second lateral end surface 10B at rear end B. First lateral end surface 10A may be substantially parallel to second lateral end surface 10B. Similarly, middle plate 30 may have a first lateral end surface 30A at front end A, and a second lateral end surface 30B at rear end B. First lateral end surface 30A may be substantially parallel to second lateral end surface 30B. It also is contemplated that lateral end surfaces 10A, 10B, 30A, and/or 30B may be substantially parallel to one another. In some embodiments, posts 12 and 14 may be disposed closer to first lateral end surfaces 10A and 30A than to second lateral end surfaces 10B and 30B. In some embodiments, post 16, spine 60, and moving assembly 20, each may be positioned closer to second lateral end surfaces 10B and 30B, than to first lateral end surface 10A and 30A.

Top plate 10 and middle plate 30 may each have a central cavity or recess 15, 32 that extends from the front end A of the test fixture 100 towards its back end B. In particular, cavity 15 may extend from an opening 10C in first lateral end surface 10A of top plate 10, toward second lateral end surface 10B. Similarly, cavity 32 may extend from an opening 30C in first lateral end surface 30A of middle plate 30, toward second lateral end surface 30B. In some embodiments, it is contemplated that openings 10C and 30C face a same direction (i.e., facing the front end A of testing device 100). However, this is not a requirement, as it is contemplated that opening 10C may extend through second lateral end surface 10B, such that cavity 15 extends from second lateral end surface 10B toward a center of top plate 10. In the alternative embodiment, opening 15C may face rear end B. Although not a requirement, in some embodiments, as illustrated in the figures, central cavity 15 may be positioned substantially centrally on the width of the top plate 10, and central cavity 32 may be positioned substantially centrally on the width of the middle plate 30. Central cavity 15 on the top plate 10 may extend from the front end A to a back (closed) end 15A (see FIG. 2A), and central cavity 32 on the middle plate 30 may extend from the front end A to a back (closed) end 32A (see FIGS. 1A, 2A). Central cavity 15 on top plate 10 and central cavity 32 on middle plate 30 may be arranged on the respective plates such that they are vertically aligned. That is, when viewed from the top of the test fixture 100, central cavity 15 may be located directly over central cavity 32 (see FIGS. 2A, 2B). In other words, one or more longitudinal axes (substantially parallel to the Z axis) may intersect each of cavities 15 and 32. The intersecting longitudinal axes may be substantially parallel to the longitudinal axes of posts 12, 14, and 16, spine 60, and moving assembly 20. As will be described later, a bracket 80 (e.g., a U-shaped bracket that supports different types of samples) may be coupled to the central cavity 15 on the top plate 10. When test fixture 100 is used to support a sample during a test, the sample may be positioned in (or may be inserted into) the test fixture 100 via one or both of central cavities 15, 32. Central cavities 15 and 32 may have any shape and size. In general, the shape and size of the central cavities 15 and 32 may depend on the size and configuration of the samples that are intended to be used with test fixture 100. In some embodiments, one or both of central cavities 15 and 32 may have a generally rectangular or U-shape. In general, central cavities 15 and 32 may be sized such that these cavities 15, 32 do not extend from the front end A all the way to the back end B of test fixture 100. That is, as seen in FIGS. 1A, 1C, 2A, and 2B, the top plate 10 and the middle plate 30 may include a strip of material that extends from the back ends 15A, 32A of their respective central cavity 15, 32 to the back end B of the test fixture 100. Furthermore, back (closed) ends 15A and 32A may be positioned closer to second lateral end surfaces 10B and 30B than to first lateral end surface 10A and 30A.

The spine 60, that couples the top and bottom plates 10, 50, may extend through the middle plate 30 via a vertically-extending cavity 36 (or a through-hole) positioned between the back end 34 of central cavity 32 and the back end B of the test fixture 100 (see FIG. 1C). Cavity 36 may be sized such that the spine 60 extends through the middle plate 30 without interfering with the vertical movement of middle plate 30 (which will be described later). For example, in some embodiments, the cavity 36 may be sized such that the spine 60 may extend through the middle plate 30 without physically contacting it. The spine 60 may be fixedly coupled to the top and bottom plates 10, 50, for example, using fasteners. For example, as seen in FIG. 1C, fasteners 52A, 52B may extend through cavities on the spine to couple the spine 60 to the bottom plate 50. Similar fasteners (not shown) may extend through cavities 16A and 16B on the top plate 10 to couple the spine 60 to the top plate 10. These fasteners that are used to couple spine 60 to the top plate 10 may extend through the cavities 16A, 16B into central cavity 15 (of the top plate 10) through the back end 14 of the central cavity 15. The portion of these fasteners that extend into the central cavity 15 may be used to attach the bracket 80 (or another suitable bracket, change part, or the like) to the central cavity 15. Although the spine 60 is illustrated as a rectangular shaped part, this is only exemplary. In general, the spine 60 may have any suitable shape and size (e.g., width, thickness, etc.) that provides sufficient stiffness to the test fixture 100. In some embodiments, the spine 60 may be sized and include material (or otherwise be configured) to provide sufficient stability to the test fixture 100 to resist torsional and/or bending forces that may result during testing (e.g., resultant torsional and bending forces on test fixture 100 from the samples supported by the test fixture). Spine 60 may be formed in any suitable manner. In some embodiments, spine 60 may be a 3D printed component that is configured to provided added stiffness in the length direction. More particularly, spine 60 may generally be a polymeric 3D-printed component. In some embodiments, one or more sheets of reinforcing material may be embedded within spine 60. For example, spine 60 may be printed from a plastic composite material having one or more reinforcing materials therein, e.g., metal strands. In another example, spine 60 may include sheets of printed metal or fiberglass within an otherwise 3D-printed polymeric plate. The inclusion of 3D-printed reinforcing material may help ensure that spine 60 is of sufficient rigidity to resist the torsional and/or bending forces that may result during testing, while also being quickly and easily manufactured on demand. As discussed above, spine 60 may have plates integrated therein to help achieve enough torque on the bolts extending through the entire fixture 100. The upper through bolts that make fixture 100 a single continuous unit may, in some embodiments, introduce slack between the components that may affect the rigidity of fixture 100. Thus, in at least some embodiments, it is desirable for the single continuous unit—fixture 100—to be rigid for accurate testing results.

Repetition testing was used to demonstrate the effectiveness of spine 60, with and without reinforcement. During the repetition testing, a load was applied to top plate 10. The load was approximately 200 N, and the deflection of top plate 10 was measured over time during application of the load. This approximate load is significantly higher than the loads applied during use of test fixture 100 in various medical syringe tests, including, e.g., 1) break loose glide force tests (e.g., from under about 1 N to about 20 N), 2) override force tests for lockout mechanisms (e.g., from about 50 N to about 100 N), 3) injection force tests for auto-injectors (e.g., from about 50 N to 100 N), and 4) cap removal force tests (e.g., from about 50 N to about 100 N). During the break loose glide force tests, displacement per unit force may be measured for about 15 mm to about 20 mm of displacement, for example. These tests generally span about 3 seconds to about 5 seconds, or up to about 10 seconds. However, these durations are only exemplary, and other durations are also contemplated. At this approximate load, and after reinforcing spine 60 with metal plates, as described above, the measured displacement of top plate 10 at an approximately 200 N load was approximately 0.225 to 0.242 mm (a sampling of data is shown in the "Displacement-supported" column of Table 1 below), with a standard deviation of 0.0049 mm. In yet another test, in a fixture without any spine 60, the measured displacement of top plate 10 at the same approximately 200 N load ranged from 1.164 nm to 1.193 mm (a sampling of the data is shown in the "Displacement-unsupported" column of Table 1), with a standard deviation of 0.0068 mm. The repetition testing described herein was performed in April 2019. During the repetition tests, an ElectroPuls Instron machine was used to apply a 200 N load in an upward direction, and then in a downward direction to top plate 10, cyclically. Each cycle (including both the upward and downward application of the force) was one second in duration, and the testing of each fixture was performed for 72 hours (259200 cycles or 259200 seconds). Displacement of top plate 10 was measured after every five cycles (seconds). Table 1 reflects a sampling of the data collected during the repetition testing. The testing of the supported and unsupported fixtures occurred on different days. The difference in displacement for equivalent cycles between the two tests ranged from 0.927 mm to 0.964 mm, with a standard deviation of 0.0349 mm. It was observed that much of the (relatively little) deviation in the displacement data collected during repetition testing was attributable to temperature changes in the testing area. In yet another test not shown in Table 1, where spine 60 was made from only plastic and without any reinforcing material, the displacement of top plate 10 was approximately 0.35 to 0.40 mm.

TABLE 1

Sampling of Repetition Test Data on Supported and Unsupported Test Fixtures

| Total Cycles | Displacement - supported (mm) | Displacement - unsupported (mm) | Difference in Displacement |
|---|---|---|---|
| 5 | 0.225104387 | 1.186095711 | 0.960991325 |
| 5000 | 0.226091607 | 1.188097868 | 0.962006261 |
| 10000 | 0.225102543 | 1.182101008 | 0.956998465 |
| 15000 | 0.226107589 | 1.177102041 | 0.950994452 |
| 20000 | 0.227088495 | 1.173071463 | 0.945982968 |
| 25000 | 0.228100526 | 1.171105851 | 0.943005325 |
| 30000 | 0.228104046 | 1.171096575 | 0.942992529 |
| 35000 | 0.227086986 | 1.171095905 | 0.944008919 |
| 40000 | 0.227086819 | 1.170096782 | 0.943009963 |
| 45000 | 0.227090115 | 1.168083672 | 0.940993557 |
| 50000 | 0.227099894 | 1.166106102 | 0.939006208 |
| 100000 | 0.237105707 | 1.177081366 | 0.939975659 |
| 150000 | 0.238084937 | 1.16809686 | 0.930011923 |
| 200000 | 0.237095593 | 1.18107931 | 0.943983717 |

TABLE 1-continued

Sampling of Repetition Test Data on Supported and Unsupported Test Fixtures

| Total Cycles | Displacement - supported (mm) | Displacement - unsupported (mm) | Difference in Displacement |
|---|---|---|---|
| 250000 | 0.233097816 | 1.185098488 | 0.952000672 |
| 259200 | 0.237105987 | 1.190109637 | 0.95300365 |

Thus, by adding spine 60, the displacement exhibited by top plate 10 under load (200 N) was reduced compared to a test fixture without spine 60. Furthermore, by adding printed metal supports to spine 60, the displacement exhibited by top plate 10 under load (200 N) was reduced compared to a test fixture having a spine 60 composed of only printed plastic. In certain embodiments, test fixture 100 may be configured such that, when a load of 200 N is applied to top plate 10 over a course of 72 hours, top plate 10 may exhibit a displacement of no more than about 0.40 mm, about 0.35 mm, about 0.25 mm, about 0.24 mm, or about 0.23 mm. Top plate 10 may be physically coupled to bottom plate 50 such that when a load of 200 N is applied to top plate 10 over a course of 72 hours, top plate 10 may exhibit a displacement of no more than about 0.40 mm, about 0.35 mm, about 0.25 mm, about 0.24 mm, or about 0.23 mm.

Furthermore, according to the present disclosure, spine 60 may or may not be reinforced. In some embodiments, reinforcement may not be needed when spine 60 is configured to withstand loads expected to be applied during operation (e.g., testing of injection medical devices). In other words, reinforcement may not be needed when spine 60 is able to support top plate 10 such that top plate 10 exhibits acceptably low deformation or no deformation under the loads contemplated during testing of injection medical devices. For example, it is believed that when components of fixture 100, including spine 60, are fabricated from plastic (and without reinforcement) on a single 3-D printing machine in the same day, the performance (i.e., lack of deflection of top plate 10) of such a spine 60 would be comparable to the performance of spine 60 having reinforcing material therein.

Middle plate 30 may also include a recessed cavity or track 38 that extends in the X-Y plane transverse (or substantially perpendicular) to central cavity 32 (see FIG. 1A). Track 38 may include a first portion 38A that extends on one side of central cavity 32 and a second portion 38B that extends on the opposite side of central cavity 32. First portion 38A may be collinear with second portion 38B. Track 38 may be a slotted cavity that is configured to slidably support one or more components therein. A finger assembly 40 may be slidably supported on each portion 38A, 38B of track 38 (only one finger assembly 40 (on first portion 38A) is shown in FIG. 1A). Each finger assembly 40 may be configured to slide on track 38 towards and away from central cavity 32. Although not a requirement, in some embodiments, each finger assembly 40 may be a spring-loaded component (or assembly of components) that is biased towards the central cavity 32. That is, the finger assembly 40 on the two portions 38A and 38B of the track 38 may be biased towards each other.

Each finger assembly 40 may include a base 42, or a carriage, that is configured to slide on the track 38 towards and away from the central cavity 32. Although not required, in some embodiments (not shown), a thumb-screw (or another mechanism such as, for example, slots, etc.) may be provided to lock the base 42 at a desired location on the track 38. A finger member, or a finger 46, may be coupled to the base 42 of each finger assembly 40 using a thumb-screw 48. As best seen in FIG. 1A, finger 46 may be an elongate component that extends from an end proximate the thumb-screw 48 to an opposite end towards central cavity 32. The finger 46 is coupled to the base 42 such that the length of the finger 46 makes an angle with the base 42. That is, the finger 46 may be angled with respect to the base 42. The angle which the finger 46 makes with the base 42 may be changed using the thumb-screw 48. For example, loosening the thumb-screw 48 (e.g., by turning the thumb-screw 48) allows the finger 46 to be rotated about the thumb-screw 48, and the angle between the finger 46 and the base 42 changed.

In embodiments where the finger assembly 40 is spring-loaded, a spring 45 may bias finger 46 in the upward direction (i.e., toward top plate 10 and away from bottom plate 50). Spring 45 may be coupled to a peg 46a disposed on an underside of finger 46. In particular, spring 45 may be received by a groove (not shown) on or adjacent to peg 46a. Spring 45 also may be coupled to a screw or other fastener 46b. Fastener 46b may couple base 42 to a protrusion that is received by the slot or recess of track 38. Thus, when a downward force (by a sample or testing instrument) is applied to finger 46, spring 45 may compress to enable finger 46 to pivot downward. Upon release of the downward force, spring 45 may expand to its resting state, and finger 46 may return to its own original and/or resting position. In some embodiments, the presence of spring 45 may enable the testing of samples without any clamping of the samples. For examples, in some embodiments, the samples may be secured only by tension.

The end of the finger 46 positioned towards the central cavity 32 may be configured to contact and support a sample in the test fixture 100 during testing. For example, in an embodiment where a syringe is supported on the test fixture 100 for testing, the body of the syringe may be vertically supported by the fingers 46 of the finger assemblies 40 on either side of the central cavity 32 such that the syringe extends through the central cavity 32 towards the bottom plate 50. While in this configuration, a loading arm of the UTM may descend into the test fixture 100 through central cavity 15 on the top plate 10 and apply the desired type of force (tensile force, compressive force, etc.) at a desired location of the syringe. The ability to translate the finger assembly 40 on the track 38 (e.g., in the X-direction in FIG. 1A) enables different sizes of samples (e.g., syringes, beakers, etc.) to be supported on the test fixture 100 using the fingers 46. Furthermore, the end of finger 46 positioned towards central cavity 32 may include an inwardly-facing recess 46c that may be used to support a flange of a syringe or injector being tested (such as, e.g., a finger flange of a syringe). It should be noted that, although a particular configuration of finger assembly 40 with fingers 46 is illustrated in the figures, this is only exemplary. In general, the finger assembly 40 and fingers 46 may have any configuration.

As previously explained, the middle plate 30 of the test fixture 100 is slidably coupled to the posts 12, 14, 16. The moving assembly 20 may be used to slide the middle plate 30 on the posts 12, 14, 16, and move the middle plate 30 in the vertical direction (i.e., towards or away from the top or bottom plates 10, 50). With reference to FIG. 1C, moving assembly 20 includes a screw 22 that is supported on a collar, such as, a split-clamp 56 (e.g., a McMaster split clamp), provided on bottom plate 50. In some embodiments, as illustrated in FIG. 1C, split-clamp 56 may be provided in, or embedded in, a correspondingly shaped cavity formed on a thumb-wheel 54 formed on the bottom plate 10. In some embodiments, as illustrated in FIG. 1C, the thumb-wheel 54 is a tire-shaped projection on the bottom plate 50 that includes a central cavity that supports the split-clamp 56.

As would be recognized by a person skilled in the art, rotating the thumb-wheel 54 about the longitudinal (Z) axis of assembly 20, allows the screw 22 (e.g., endless screw) to rotate on the bottom plate 50. Screw 22 may be self-braking and have a screw geometry such that pressing on the middle plate 30 will not cause the middle plate 30 to translate vertically. Instead, the moving assembly 20 may be configured such that the middle plate 30 can be moved vertically only by turning the thumb-wheel 54. For example, middle plate 30 may include a bearing, fastener (e.g., a nut) 24 having threads that receive threads of screw 22. The top end of the screw 52 includes a bearing 26 attached thereto. In some embodiments, the bearing 26 may have semi-spherical bore that the top end of the screw 52 is snapped into. In some embodiments, the bearing 26 is not attached to the top plate 10. In some embodiments, the top of the bearing 26 may contact the back surface of the top plate 10 such that the bearing 26 can slide (in the XY plane) on the top plate 10 to minimize the impact of misalignment of moving assembly 20, e.g, turn-screw assembly 20, on the test fixture 100. When the thumb-wheel 54 is turned (or rotated), the screw 22 (and the bearing 26) rotates with respect to the top and bottom plates 10, 50. The screw 22 extends through the middle plate 30 through a bearing 24 fixed thereto. As would be recognized by a person skilled in the art, the bearing 24 translates the rotational motion of the screw 22 to linear motion of the middle plate 30 attached thereto. Although not seen in the figures, in some embodiment, middle plate 30 may also include a bearing (e.g., a brass bearing, bronze bearing, etc.) positioned in the cavity through which the screw 22 extends. Turning the thumb-wheel 54 causes the ball screw 22 to rotate about the top and bottom plates 10, 50 and causes the middle plate 30 to translate up and down in the vertical direction (Z-direction). Rotation of the thumb-wheel 54 in one direction causes the middle plate 30 to move in one direction (e.g., towards top plate 10 or towards bottom plate 50), and rotation of the thumb-wheel in the opposite direction causes the middle plate 30 to move in the opposite direction. The ability to move the middle plate 30 up or down enables different types and sizes of samples to be supported in the test fixture 100.

It also is contemplated that moving assembly 20 may be any suitable linear motion component configured to translate middle plate 30 relative to top plate 10 and bottom plate 50 along the Y-axis. For example, moving assembly 20 may include a pulley system or the like.

Figure 3:
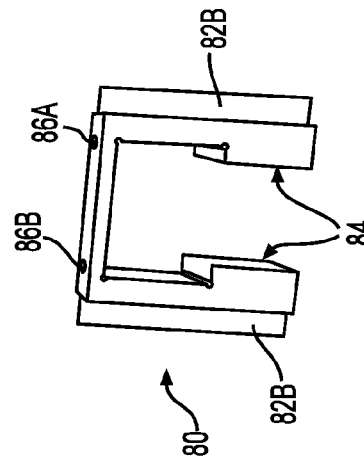
FIG. 3 is a perspective view of an exemplary sample bracket.

As explained previously, central cavity 15 of the top plate 10 may support a bracket 80 (see FIGS. 1A, 1B, 2A, 2B). An exemplary bracket 80 that may be supported in top plate 10 is shown in FIG. 3. As best seen in FIGS. 1A and 1B, the side walls of the central cavity 15 may include a slot 82A (e.g., a rectangular recess, etc.). In some embodiments, the slot 82A extends along the length of the central cavity 15 from front end A of the test fixture 100 to the back end 14 of the central cavity 15 (i.e., along the Y-axis, see FIG. 2A). Slot 82A on the side walls of the central cavity 15 is configured to slidably receive a correspondingly shaped projection 82B on the sides of the bracket 80. The bracket 80 may be attached to the central cavity 15 by engaging the projection 82B with slot 82A of the central cavity 15, and sliding the bracket 80 into the central cavity 15 such that the front surface of the bracket 80 is flush with the front surface of the top plate (see FIGS. 1A, 1B). The fasteners that are used to couple spine 60 to the top plate 10 may then be inserted into the cavities 16A, 16B (see FIG. 1C). These fasteners may extend through the top plate 10 into screw holes 86A, 86B (see FIG. 3) on the back surface of the bracket 80 to attach the spine 60 and the bracket 80 to the top plate 10.

The bracket 80 may also be used to support samples in the test fixture 100 for testing. The inner end of the bracket 80 may include features 84 that are configured to engage with the sample and support the sample on the bracket 80. It should be noted that the bracket 80 and the features 84 illustrated in FIG. 3 are only exemplary. In general, the bracket used and the type of features provided on the bracket will depend on the type of sample to be supported. In some embodiments, a first bracket (e.g., bracket 80) may be used to support one type of sample during one test. After the test, the bracket may be removed and another bracket attached to the central cavity 15 to support a different sample for another test. The ability to quickly switch brackets that are configured to support different types of samples increases the flexibility of the test fixture.

Figure 3A:
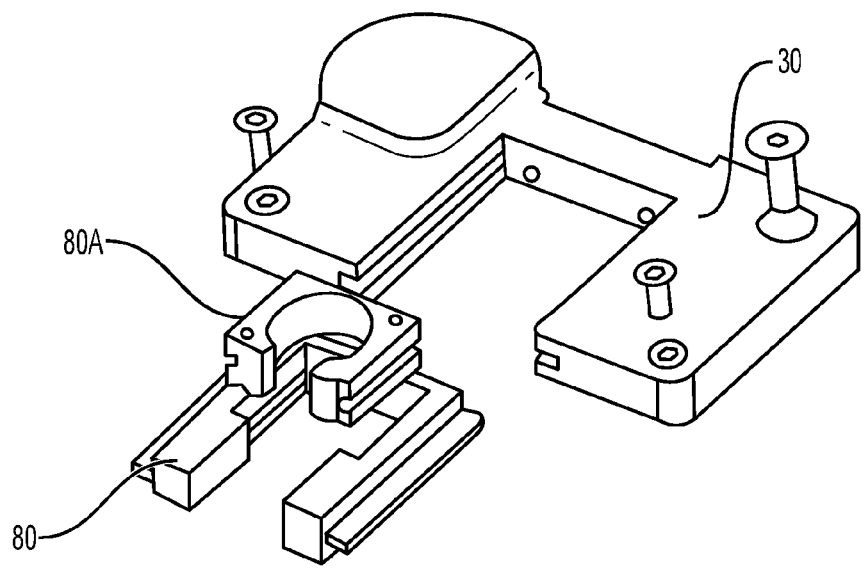
FIGS. 3A and 3B show exploded views of exemplary sample brackets with a top plate.
Figure 3B:
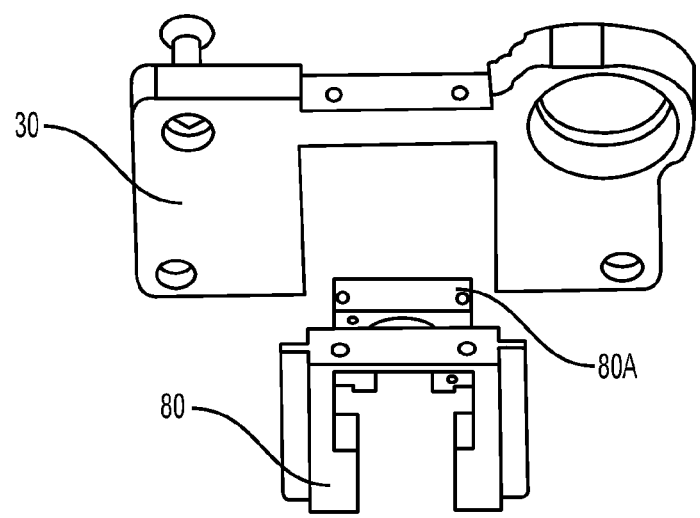
Figure 4A:
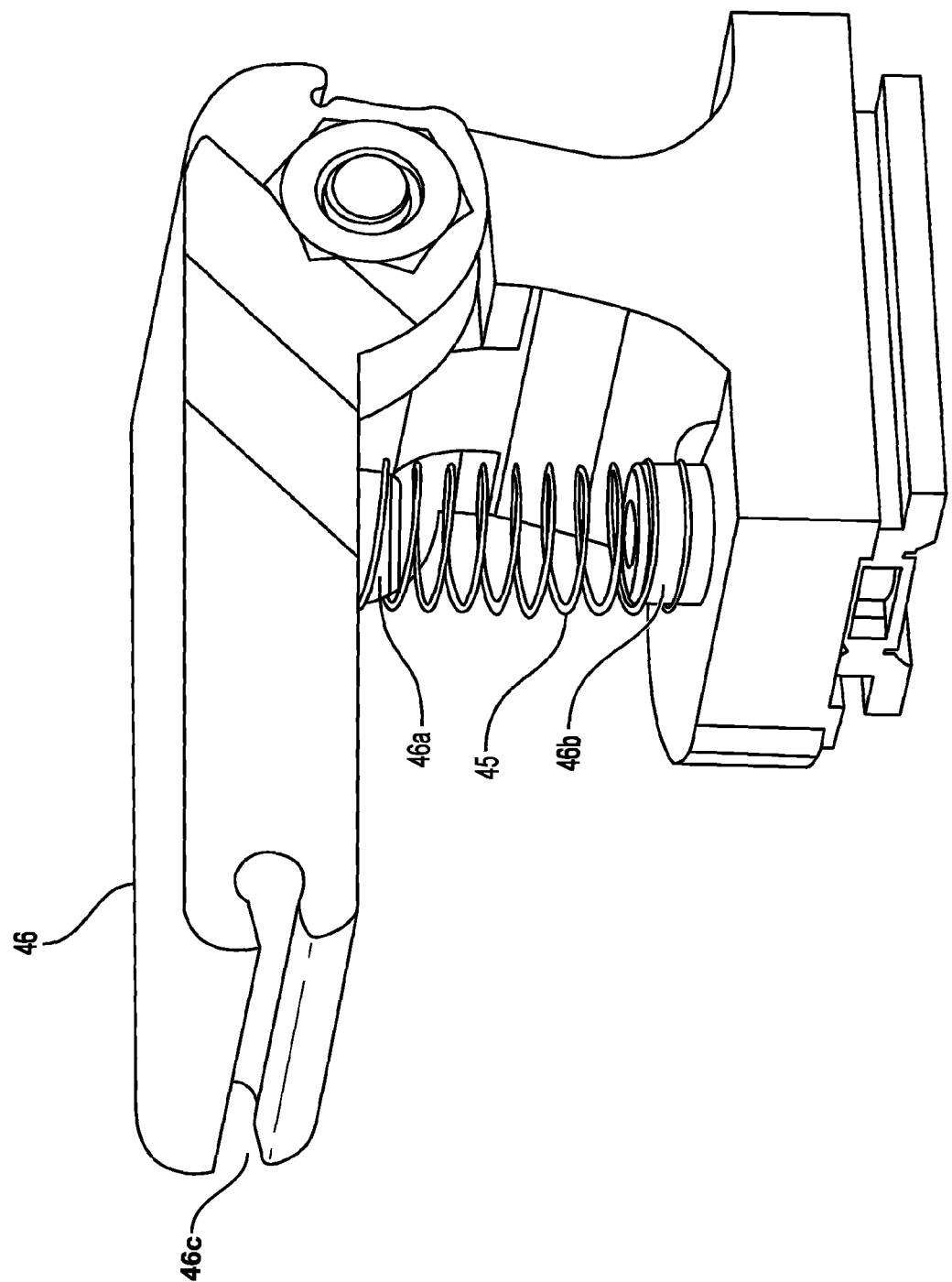
FIGS. 4A-4C illustrate different views of a finger assembly used with the exemplary test fixture of FIGS. 1A-1D.
Figure 4B:
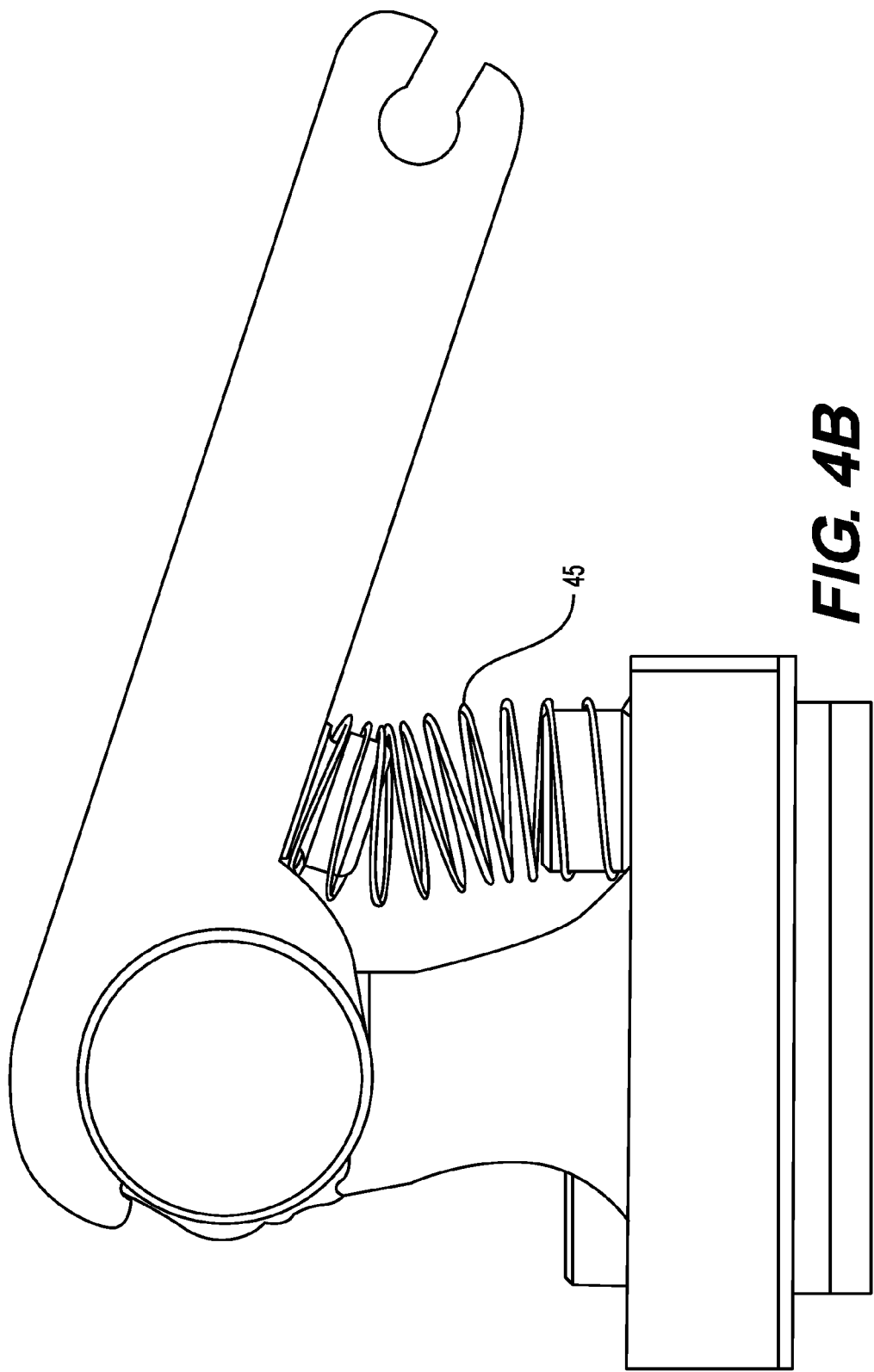
Figure 4C:
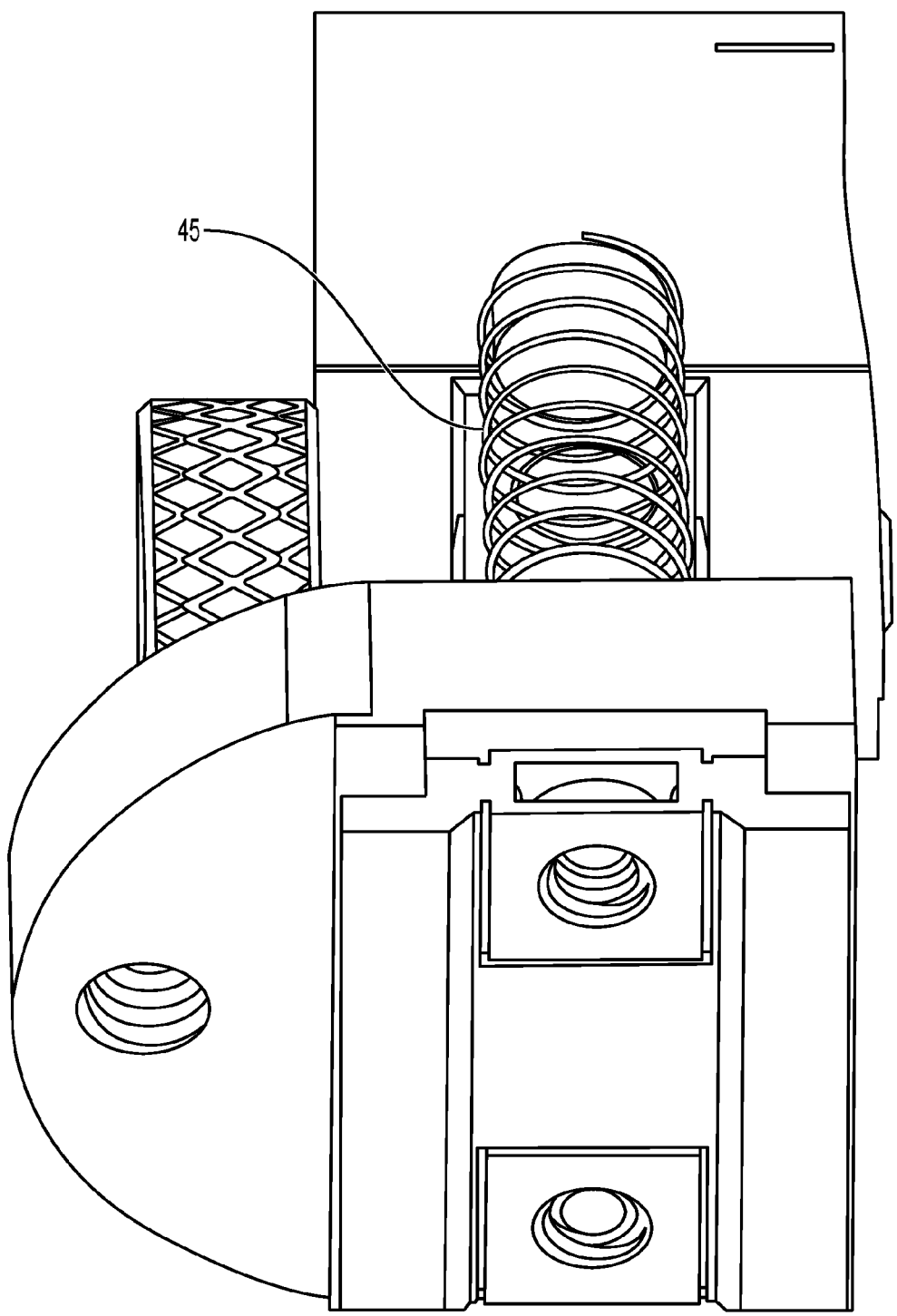

In some embodiments, the features provided on a bracket 80 may be configured to support another bracket. For example, with reference to bracket 80 of FIGS. 3, 3A, and 3B, in some embodiments, the features 84 on the inside surface of the bracket 80 may be configured to engage with and support another bracket 80A (e.g., an inner bracket 80A that fits in bracket 80 and is configured to support some test samples) that is configured to support a sample. In such embodiments, the bracket attached to the top plate 10 (e.g., bracket 80) may not be replaced to support a differently configured test sample. Instead, the inner bracket 80A that is supported by the bracket 80 attached to the top plate may be substituted with another inner bracket that is configured to support the new test sample. The ability to quickly replace brackets and/or inner brackets to support different sample configurations enables the test fixture 100 to be used to support many different configurations of test samples.

Inner bracket 80A may include a circular opening and other suitable features configured to support test samples, such as, e.g., syringes. In some embodiments, inner bracket 80A may be configured to receive one or more syringe adapters or pucks used in tests conducted by the UTM. The syringe adapters or pucks may be commercially available or custom-made, and may be individually designed to support different samples, syringes, containers, or the like. For example, the adapters or pucks may be configured to accommodate or support various syringe diameters, shapes, configurations, or the like.

In some embodiments, the bracket (e.g., bracket 80) in the top plate 10 and the finger assemblies 40 in the middle plate 30 may be configured to jointly support a sample for a test. For example, a syringe that extends through (e.g., vertically through) both cavities 12 and 32 (of top and middle plates 10, 30) may be supported both by bracket 80 of the top plate 10 and by the fingers 46 of finger assemblies 40 of the middle plate 30. The ability to change the gap between the top and the middle plates 10, 30, by vertically moving the middle plate 30 using the thumb-wheel 54 enables samples of different configurations and sizes to be easily supported on test fixture 100 without a change in fixturing. The ability to easily reconfigure the test fixture 100 for testing different test samples increases efficiency while saving time and money.

Figure 5A:
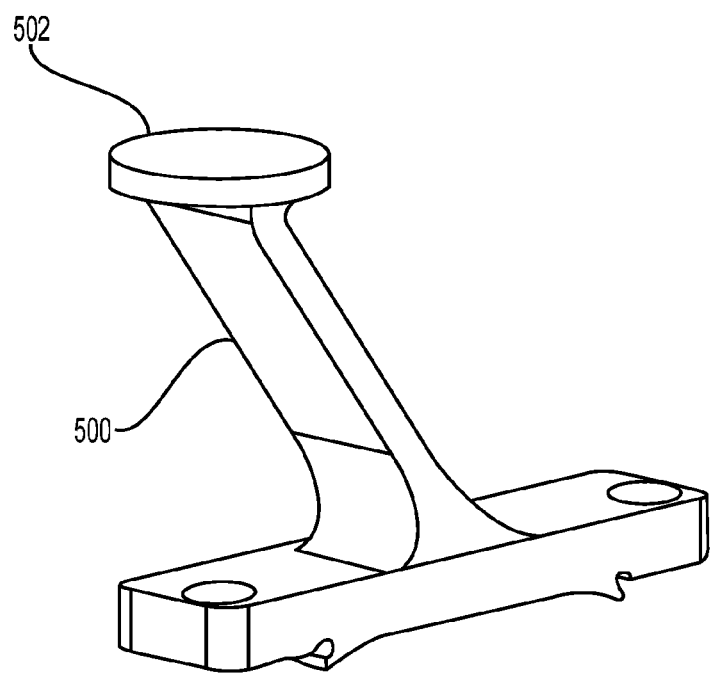
FIGS. 5A-5E show exemplary change parts.
Figure 5B:
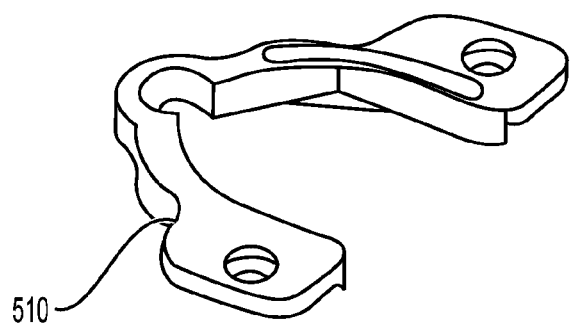

FIGS. 5A and 5B show exemplary change parts that are mountable to the center plate 30. For example, FIG. 5A shows a sample retention arm 500 that can be used to support a sample collection container on a platform 502. For example, retention arm 500 may be used to support "bulk" primary containers (i.e., syringes) being tested in tension, or retention arm 500 may be used to hold a waste collection cup when weighing of the sample is not required. These uses are non-limiting, and it is contemplated that retention arm 500 may be used in other testing applications as well. The sample collection container may collect liquids ejected from a syringe or test device during testing. Similarly, FIG. 5B shows a holder 510 that can be used to support or hold a centrifuge tube or the like. The change parts or adapters shown in FIGS. 5A and 5B may be used in certain tests that do not utilize finger assemblies 40. Retention arm 500 and/or holder 510 may be coupled to center plate 30 by one or more fasteners (e.g., bolts) that extend through apertures on retention arm 500 and/or holder 510, and through apertures on center plate 30.

Figure 5C:
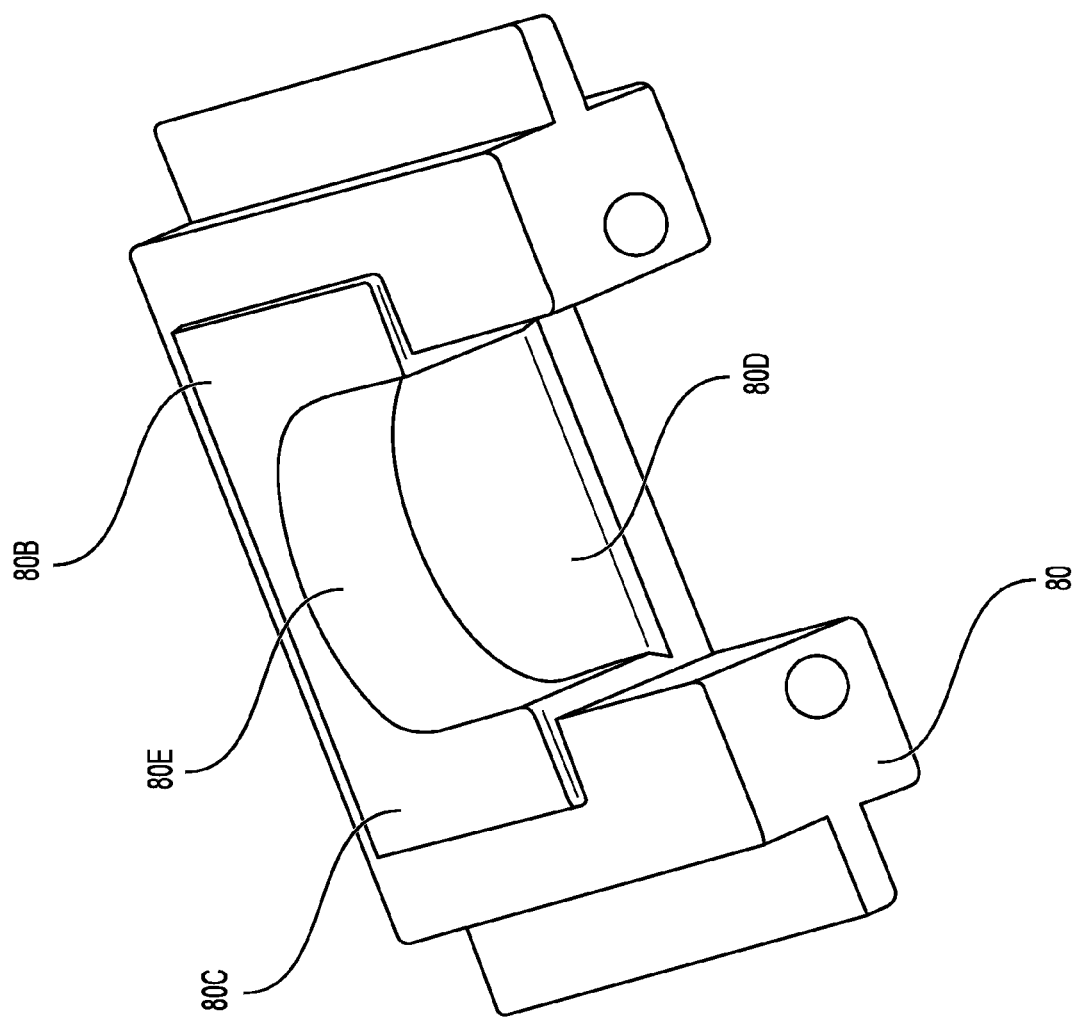
Figure 5D:
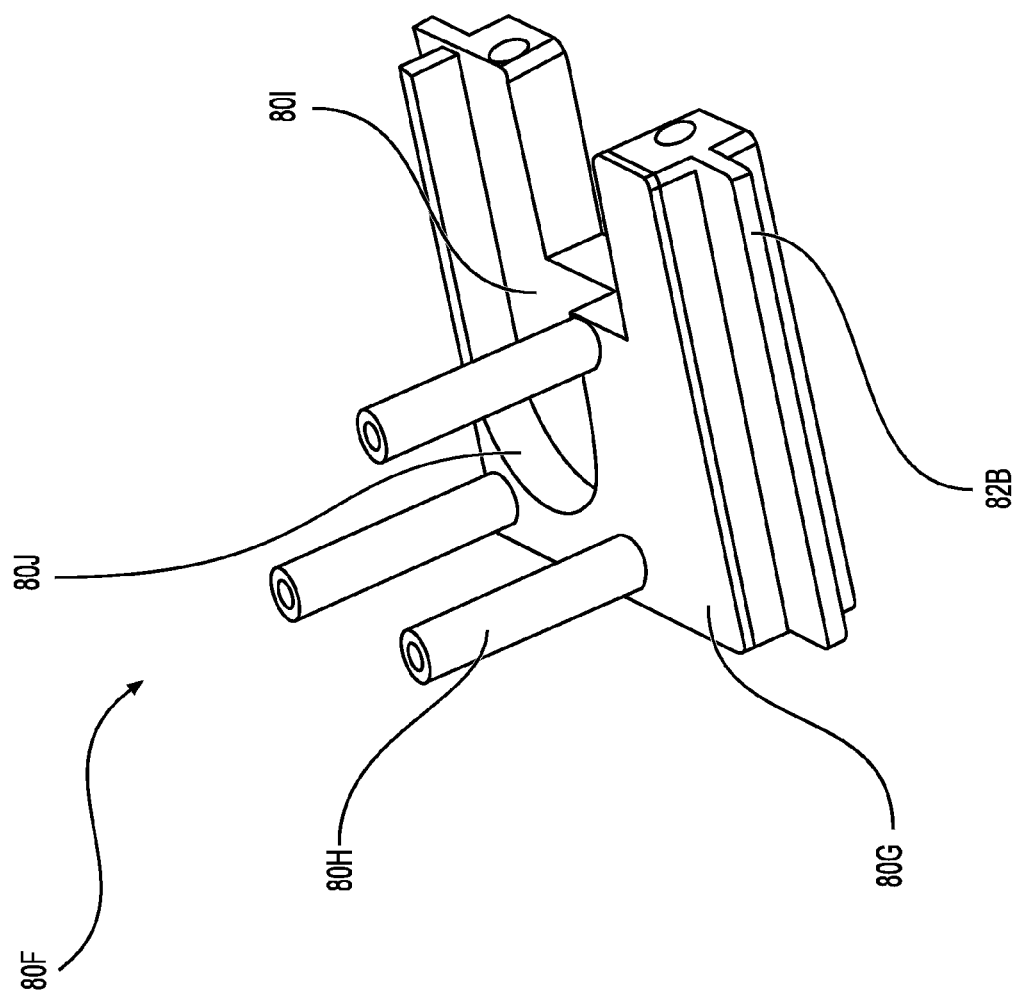
Figure 5E:
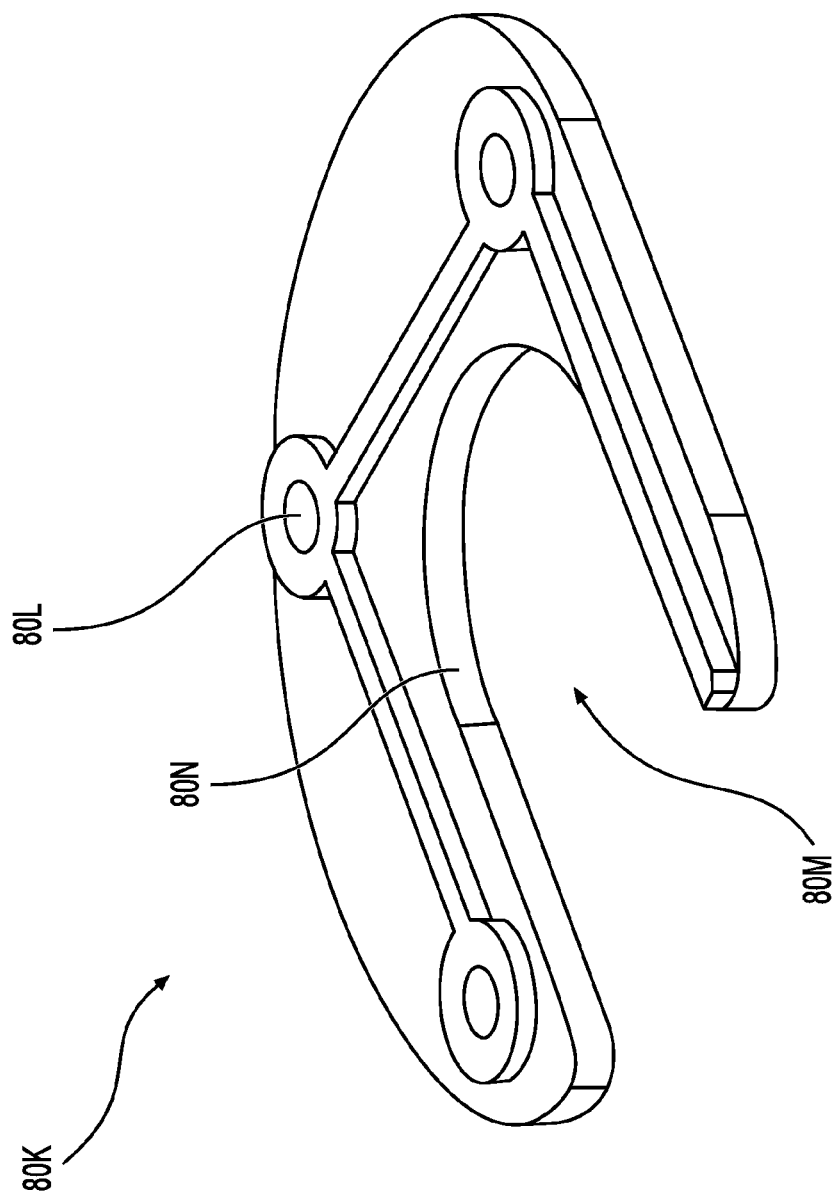

FIGS. 5C-5E show exemplary change parts that can be used with top plate 10 to conduct tests on e.g., an ISO vial or other similar container. FIG. 5C shows bracket 80 used with an inner bracket 80B (in lieu of inner bracket 80A discussed above). Inner bracket 80B may be used to support vials for puncture testing. Inner bracket 80B may include a mating flange 80C that is configured to rest on a top surface of bracket 80, in order to couple inner bracket 80B to bracket 80. Inner bracket 80B also may include a base surface 80D that is offset from (in a different plane than) mating flange 80C, although it is contemplated that in at least some embodiments, mating flange 80C and base surface 80D may be coplanar. A side wall 80E may be disposed between mating flange 80C and base surface 80D, and, in some embodiments, may be substantially perpendicular to both mating flange 80C and base surface 80D. Side wall 80E may include a partially cylindrical portion that is connected on opposing ends to substantially parallel portions of side wall 80E. The partially cylindrical portion of side wall 80E may have a radius that approximates or is slightly larger than the radius of a sample container or vial to be tested. Furthermore, the distance between the substantially parallel portions of side wall 80E may approximate or may be slightly larger than the radius of a sample container or vial to be tested. During testing, a bottom portion of a sample container or vial may be supported by base surface 80D and side wall 80E.

FIG. 5D shows a bracket 80F that may be inserted into top plate 10 in a substantially similar manner as bracket 80 discussed herein, for example, using protrusions 82B. Bracket 80F may include a top surface 80G that is positioned above and offset from protrusions 82B, although they may be coplanar in some embodiments. Bracket 80F may include one or more posts 80H that extend upwardly and away from top surface 80G. In the embodiment shown, bracket 80F includes three posts 80H, but this number is not limiting, and bracket 80F may include more or less posts 80H. Each post 80H may include a lumen extending therethrough, and also may include one or more mating features, such as threads, rails, or the like, in order to receive complementary features of a fastener (such as a bolt or screw). Bracket 80F may include a base surface 80I that is positioned lower than and offset from top surface 80G. A sidewall 80J may be disposed between and substantially perpendicular to top surface 80G and base surface 80I. Similar to side wall 80E discussed above, side wall 80J may include a partially cylindrical portion that is connected on opposing ends to substantially parallel portions of side wall 80J.

FIG. 5E shows a retention plate 80K that may be coupled to and used in conjunction with bracket 80F for conducting cap removal force testing on a sample container or vial (where test forces are rotational from a side of the sample container or vial). Retention plate 80K may include one or more openings 80L extending therethrough that are each configured to be aligned with a corresponding post 80H from bracket 80F. In the embodiment shown, retention plate 80K includes three openings 80L, but this is not limiting, and retention plate 80k may include additional or fewer openings 80L. Retention plate 80K may include a recess 80M that at least partially corresponds in shape to base surface 80I of bracket 80F. Additionally, a side wall 80N may surround recess 80M, and portions of side wall 80N may correspond in shape and geometry to side wall 80J of bracket 80F. The partially cylindrical portions of side walls 80J and 80N may be vertically aligned when retention plate 80K is coupled to bracket 80F.

Retention plate 80K may be coupled to bracket 80F by aligning openings 80L with the openings of the lumens of posts 80H. A fastener (such as a screw or bolt) may be inserted through a respective opening 80L/post 80H to secure retention plate 80K to bracket 80F. The corresponding shapes of retention plate 80K and bracket 80F may allow both retention plate 80K and bracket 80F to support different portions of the same sample container or vial. For example, base surface 80I and side wall 80J may support a bottom portion of a sample container or vial, while side wall 80N may support an upper or intermediate portion of the same sample container or vial.

The components of FIGS. 5C-5E, similar to other change parts described herein, may be designed and manufactured in substantially less time than existing components used to conduct the same tests. For example, the components of FIGS. 5C-5E may be designed in less than three hours, and may be printed in less than ten hours. These change parts, as described above, may be used in the testing of ISO vials, while test fixture 100 may help keep the samples and change parts concentric, and help position the sample containers or vials to the minimum test height of the system. Test fixture 100, and its various change parts, allow for rapid modification of test fixture 100 to accommodate testing of different components (e.g., prefilled syringes and ISO vials), whereas existing testing arrangements require significantly more hardware and setup time/costs.

Embodiments of the present disclosure may be used in any suitable testing configuration. For example, embodiments of the present disclosure may be used to collect force versus time date in syringe or auto-injector testing. The disclosed devices can be used in syringe/plunger force tests such as, e.g., breakaway force tests (determining the force required to initially depress a plunger) or sustaining/glide force tests (determining the force required to keep the plunger moving). The disclosed devices also can be used in (1) needle cap or other pull-off tests (e.g., force to remove needle/safety cap): (2) activation force and displacement tests: (3) tests for determining the force required to displace a needle guard: (4) needle penetration and pull-out tests; and (5) Luer cone breakage tests. The disclosed devices also may be used with blister pack testing, pill crush testing, or for other tests conducted by a UTM that requires new support structures to be developed or purchased. Thus, the disclosed devices may be used for any tensile or compressive test on a device, sample container, or vial, such as a medical device, that requires the tested device to be fixtured or secured in a specific orientation. The disclosed devices may be used to secure a wide variety of test structures, ranging in volume from about 0.5 mL to about 5 mL or more. Smaller and larger volume containers also are contemplated, such as, for example containers having a volume of about 0.5 mL or less, including for example, about 0.4 mL or less, about 0.3 mL or less, about 0.2 mL or less, or about 0.1 mL or less. Furthermore, containers larger than about 5 mL may be tested, including for example containers having a volume or about 10 mL or more, about 20 mL or more, about 30 mL or more, and so forth. The containers being tested may be cylindrical, conical, rectangular, pyramidal, irregular and/or may have any other suitable shape or combination of shapes.

Figure 6:
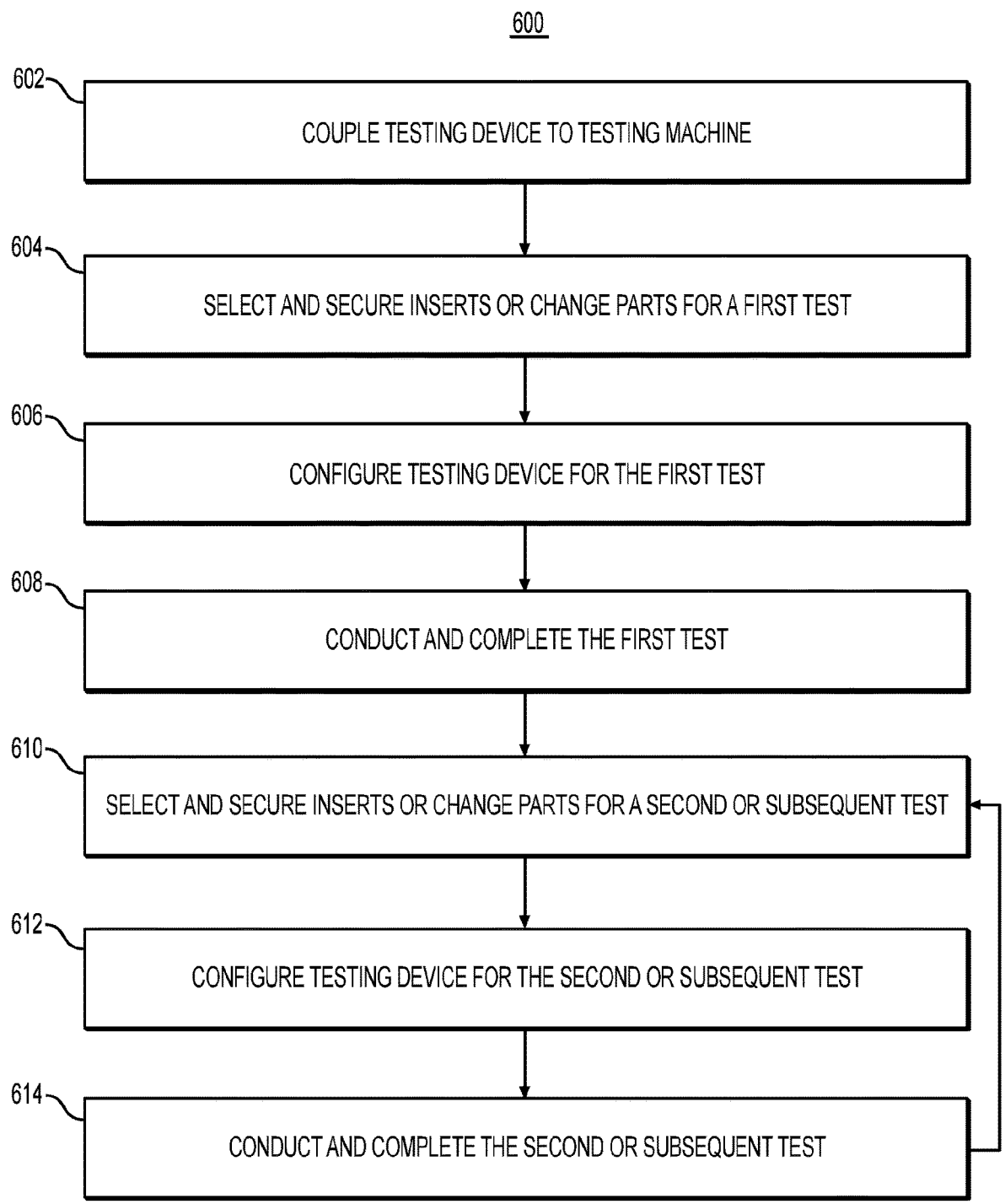
FIG. 6 shows an exemplary method of the present disclosure.

FIG. 6 illustrates an exemplary method 600. Method 600 may begin at step 602, where testing device 100 may be coupled to or otherwise secured to a testing machine, such as, e.g., a Universal Testing Machine as set forth above. Method 600 then may proceed to step 604, where a user selects and secures appropriate inserts or change parts to testing fixture 100 for a desired first test. For example, the user may select one or more of bracket 80, inner bracket 80A, finger assemblies 40, retention arm 500, holder 510 and/or any other suitable change parts needed for the first test. Method 600 also may include a step 606 where testing fixture 100 and the selected change parts may be further configured. This could include, for example, moving center plate 30 in the vertical direction as needed for the first test, adjusting the tension of finger assemblies 40, or any other required setup task. Step 606 may occur before, during, or after step 604. Then, method 600 may proceed to step 608, where the first test is conducted. In some cases, the user may wish to conduct another test using testing fixture 100, and thus, method 600 may proceed to step 610, where the user may select new inserts or change parts to be used during a second or subsequent test. From step 610, method 600 may proceed to steps 612 and 614, which may be substantially similar to steps 604 and 606, respectively, modified as needed due to differences between the first test and the second or subsequent test. Like steps 604 and 606, step 612 may occur before, during, or after step 610. After step 614, method 600 may be complete, or may return to step 610 for additional subsequent tests.

The second or subsequent test may be the same type of test (e.g., a glide test) as the first test, but may be conducted on a different sample or device (for example, a different syringe). The second or subsequent test also may be a different type of test on the same sample or device used in the first test, or a different type of test on a different sample/device used in the first test. However, regardless of the type of test or sample contemplated for use in the second or subsequent test, the same test fixture 100 may be used, and may simply require a new configuration of change parts and/or inserts. For example, a new bracket 80 and/or a new inner bracket 80A may be used in the test. In some examples, only a new inner bracket 80A may be utilized, or inner bracket 80A may be removed. In other examples, retention arm 500 and/or holder 510 may be used on center plate 30 in a second test in lieu of using finger flanges 40, or vice versa. In some embodiments, method step 610 may occur without uncoupling testing fixture 100 from the Universal Testing Machine. However, this is not limiting, and indeed, in some embodiments, it is contemplated that testing fixture 100 may be used with a different Universal Testing Machine, or with the same Universal Testing Machine while requiring some uncoupling/re-coupling between different tests.

Embodiments of the present disclosure may enable testing to be conducted with minimal overhead, compared to existing testing solutions. For example, existing testing arrangements range in cost from $100 to over $1,000. Furthermore, new arrangements must be purchased to conduct new testing, resulting in the expenditure of both capital costs, and employee labor costs (which often are significantly higher than the capital costs). Furthermore, with existing arrangements, a loss of productivity occurs during design, manufacture, and/or shipping of the new testing equipment. However, the modular testing fixture of the present disclosure may help alleviate these issues. For example, after investment in the initial module, and e.g., a 3-D printer (ranging from about $300 to about $250,000 USD or more), new tests can be conducted at significantly lower costs, particularly given that many users may have otherwise already invested in a suitable 3-D printer. Some 3-D printers may be configured to print the insert or change part into its final, ready-to-use form, while others may print an intermediate component that must be further modified. For example, with certain printers, additional support (e.g., a steel bar) may be required, or the intermediate component may need to be further milled or machined. For example, new inserts or change parts may include material costs on the order of $10-100. Design time (and thus, employee labor costs) are reduced because only the insert/change part needs to be designed, as opposed to the entire module. Still further, the insert/change parts require less design and manufacturing expertise to create, and thus, individuals who may lack significant experience in the creation of testing instruments (e.g., a chemist, chemical engineer, biomedical engineer, bio-scientist, or the like) may still be able to create a suitable insert/change part. Furthermore, to the extent that additional assistance is solicited from an engineering/design/manufacturing specialist, such assistance may limited compared to when an entire new testing arrangement is required. Still further, many of the insert/change parts of the present disclosure may be printed (e.g., by a 3-D printer) on site, reducing productivity loss since the custom insert/change parts can be ready for use in hours/days, compared to the longer time frames required for new testing arrangements to be built and shipped. Furthermore, it is contemplated that after design of the new inserts or change parts, that the 3-D printing of such inserts or change parts may be contracted to a third party 3-D printer, with costs to the user ranging from about $400 to about $700 USD.

In embodiments of the present disclosure, it is contemplated that a need for a new change part may be identified at a first point in time, and that the new change part can be designed and manufactured (by, e.g., 3-D printing) into a ready-to-use component, and subsequently used in a tensile or compressive test, in about 12 hours or less (measured from the first point in time). Other time periods also are contemplated, particularly given the complexity of certain components. In other embodiments, the new change part may be ready-to-use, and the change part actually used in a tensile or compressive test, in about 18 hours or less, or about 24 hours or less, measured from the first point in time. Furthermore, in at least some embodiments of the present disclosure, a new change part may be manufactured only by 3-D printing (i.e., sending printing instructions to the 3-D printer and printing a complete, ready-to-use component, without needing any other milling, machining, or the like).

As used herein, an insert or change part may be any component that is required to support and/or orient a test sample or container using a modular test fixture, to conduct compressive and/or tensile testing on the sample or container. The component may directly or indirectly contact the test sample or container, and may include any structure such as, but not limited to, brackets, platforms, support surfaces, posts, flanges, fasteners or the like.

While principles of the present disclosure are described herein with reference to a test fixture that may be used in conjunction with another apparatus (e.g., a UTM), it should be understood that the disclosure is not limited thereto. Rather, the systems described herein may be employed in the batteries of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A testing device, comprising:
a first platform;
a second platform including a first cavity having a first opening extending through a first lateral end surface of the second platform, wherein the first cavity extends from the first opening toward a center of the second platform;
a spine; and
a third platform fixed relatively to the first platform by the spine, the third platform including a second cavity having a second opening extending through a first lateral end surface of the third platform, wherein the second cavity extends from the second opening toward a center of the third platform;
wherein the second platform:
is disposed between the first platform and the third platform;
is movable relative to the first platform and the third platform; and
includes a third cavity, wherein the spine extends through the third cavity;
wherein the testing device further includes a moving assembly configured to move the second platform relative to the first platform and the third platform,
wherein the testing device is for use in a compression test and/or a tensile test.

2. The testing device of claim 1, wherein the moving assembly has a first longitudinal axis, the moving assembly being coupled to each of the first platform, the second platform, and the third platform, wherein rotation of the moving assembly about the first longitudinal axis causes the second platform to move relative to the first platform and the third platform.

3. The testing device of claim 2, wherein, at least a portion of each of the first cavity and the second cavity are disposed along a second longitudinal axis that is parallel to the first longitudinal axis of the moving assembly.

4. The testing device of claim 2, wherein the first platform includes an actuating assembly configured to receive an end of the moving assembly, wherein the actuating assembly includes a thumbwheel configured to rotate the moving assembly about the first longitudinal axis.

5. The testing device of claim 4, wherein the actuating assembly includes a collar surrounded by the thumbwheel, wherein the moving assembly extends through the collar.

6. The testing device of claim 1, wherein the first opening and the second opening face a same direction.

7. The testing device of claim 6, wherein the same direction is toward a front of the testing device.

8. The testing device of claim 1, wherein the first platform and the second platform are substantially parallel to one another.

9. The testing device of claim 8, wherein the first platform and the third platform are substantially parallel to one another.

10. The testing device of claim 1, wherein the first platform and the second platform are fixed relative to one another.

11. The testing device of claim 1, wherein the moving assembly includes a screw.

12. The testing device of claim 11, wherein the second platform includes a threaded fastener receiving the screw.

13. The testing device of claim 1, wherein the second platform includes a first track and a second track, wherein each of the first track and the second track is configured to receive a spring-loaded holder.

14. The testing device of claim 13, wherein the first track and the second track are collinear.

15. The testing device of claim 13, further including a first spring-loaded holder configured to be received by the first track, and a second spring-loaded holder configured to be received by the second track.

16. The testing device of claim 15, wherein the first spring-loaded holder includes a first finger and a first spring, wherein the first finger is biased toward the third platform by the first spring, and the second spring-loaded holder includes a second finger and a second spring, wherein the second finger is biased toward the third platform by the second spring.

17. The testing device of claim 1, wherein the spine includes a polymer, and one or more sheets of metal disposed within the polymer.

18. The testing device of claim 1, further including a U-shaped bracket removably received by the second cavity.

19. The testing device of claim 18, wherein the second cavity includes one or more slots, and the U-shaped bracket includes one or more protrusions configured to be received by the one or more slots.

20. The testing device of claim 1, wherein:
the second platform includes a second lateral end surface substantially parallel to the first lateral end surface of the second platform; and
the testing device includes a first support and a second support coupled to the first platform and the second platform, wherein the first support and the second support are positioned closer to the first lateral end surface of the second platform than the second lateral end surface of the second platform.

21. The testing device of claim 20, further including a third support coupled to the first platform and to the second platform, wherein the third support has a larger diameter than each of the first support and the second support, and the third support is positioned closer to the second lateral end surface of the second platform than the first lateral end surface of the second platform.

22. The testing device of claim 20, wherein the moving assembly is positioned closer to the second lateral end surface of the second platform than the first lateral end surface of the second platform.

23. The testing device of claim 1, wherein, when a load of about 200 N is applied to the third platform, the third platform exhibits a displacement of no more than about 0.40 mm.

24. The testing device of claim 23, wherein the third platform exhibits a displacement of no more than about 0.23 mm, when the load is applied.

25. A testing device, comprising:
a first platform;
a spine;

a second platform including:
  a first cavity having an opening extending through a first lateral end surface of the second platform,
  a second cavity,
    wherein the spine extends through the second cavity; and
  a first track and a second track disposed on the second platform; and
a third platform fixed relatively to the first platform by the spine;
  wherein the second platform:
    is disposed between the first platform and the third platform;
    is movable relative to the first platform and the third platform;
wherein the testing device further includes:
a moving assembly configured to move the second platform relative to the first platform and the third platform;
a first spring-loaded holder configured to be received by the first track, the first spring-loaded holder including a first finger and a first spring, wherein the first finger is biased toward the third platform by the first spring; and
a second spring-loaded holder configured to be received by the second track, the second spring-loaded holder including a second finger and a second spring, wherein the second finger is biased toward the third platform by the second spring, wherein the testing device is for use in a compression test and/or a tensile test.

26. A testing device, comprising:
a first platform;
a second platform including a cavity having an opening extending through a first lateral end surface of the second platform;
a third platform;
wherein the second platform:
is disposed between the first platform and the third platform;
is movable relative to the first platform and the third platform;
  wherein the testing device further includes:
a moving assembly configured to move the second platform relative to the first platform and the third platform; and
a spine secured to the first platform and the third platform, the second platform including an opening through which the spine extends and does not contact, wherein the spine includes a polymer, and one or more sheets of metal disposed within the polymer,
wherein the testing device is for use in a compression test and/or a tensile test.

* * * * *